United States Patent [19]
Handleman

[11] Patent Number: 4,521,165
[45] Date of Patent: Jun. 4, 1985

[54] APPARATUS FOR PUMPING FLUENT SOLID MATERIAL

[75] Inventor: Avrom R. Handleman, Webster Groves, Mo.

[73] Assignee: Semi-Bulk Systems, Inc., Overland, Mo.

[21] Appl. No.: 646,011

[22] Filed: Aug. 31, 1984

[51] Int. Cl.$^3$ .................. B65G 53/08; F04B 15/02; F04B 43/06
[52] U.S. Cl. ............................. 417/393; 406/50; 406/76; 406/96; 417/900
[58] Field of Search ............... 406/50, 76, 93, 94, 406/95, 96; 417/393, 397, 900

[56] References Cited

U.S. PATENT DOCUMENTS

| | | | |
|---|---|---|---|
| 1,489,909 | 4/1924 | Webb | 406/76 |
| 3,070,023 | 12/1962 | Glasgow | 417/397 |
| 3,291,536 | 12/1966 | Smoot | 406/50 X |
| 3,423,131 | 1/1969 | Weeks | 406/93 |
| 3,434,808 | 3/1969 | Pobst, Jr. | 406/96 X |
| 3,708,207 | 1/1973 | Steele | 406/93 |
| 3,782,863 | 1/1974 | Rupp | 417/397 X |

FOREIGN PATENT DOCUMENTS

| | | | |
|---|---|---|---|
| 2406589 | 6/1979 | France | 417/900 |
| 439207 | 12/1935 | United Kingdom | 417/900 |
| 829521 | 5/1981 | U.S.S.R. | 406/76 |

Primary Examiner—Leonard E. Smith
Attorney, Agent, or Firm—Senniger, Powers, Leavitt and Roedel

[57] ABSTRACT

Apparatus for pumping fluent solid material comprising first and second expansible chamber pumps and means interconnecting the pumps. The first expansible chamber pump has an inlet with a check valve for intake of material from a supply thereof on an intake stroke of the first pump and an outlet with a check valve for discharge of the material on a discharge stroke of the first pump. The apparatus also has a line for delivery of material from the outlet of the first pump. The second expansible chamber pump has an inlet with a check valve for intake of gas on an intake stroke of the second pump and an outlet with a check valve for discharge of gas on a discharge stroke of the second pump. Means interconnect the pumps for operation of the second pump through a discharge stroke on an intake stroke of the first pump and through an intake stroke on a discharge stroke of the first pump. A gas line interconnects the outlet of the second pump to the material delivery line downstream from and adjacent the outlet of the first pump whereby on each discharge stroke of the first pump the second pump takes in gas and on each intake stroke of the first pump the second pump pumps gas to the material delivery line behind the material delivered into the line through the outlet of the first pump on the preceding stroke of the first pump.

14 Claims, 4 Drawing Figures

APPARATUS FOR PUMPING FLUENT SOLID MATERIAL

BACKGROUND OF THE INVENTION

This invention relates to apparatus for pumping fluent solid material, and more particularly to apparatus for pumping powder.

SUMMARY OF THE INVENTION

Among the several objects of the invention may be noted the provision of improved apparatus for pumping fluent solid material, e.g. powder, by means of gas, generally air, under pressure which operates with less gas and at lower gas velocity than prior apparatus of this class and which permits discharge of the fluent solid material into an open receiver without need for means for separating the fluent material from the gas; the provision of such an apparatus which has a suction stroke for suctioning material into the apparatus from a supply; and the provision of such an apparatus which is economical in construction and reliable in operation.

In general, apparatus of this invention for pumping fluent solid material comprises first and second expansible chamber pumps, the first of which has an inlet with a check valve for intake of material from a supply thereof on an intake stroke and an outlet with a check valve for discharge of the material on a discharge stroke through a line for delivery of material from the outlet, the second of which has an inlet with a check valve for intake of gas on an intake stroke and an outlet with a check valve for discharge of gas on a discharge stroke. Means interconnects the pumps for operation of the second pump through a discharge stroke on an intake stroke of the first pump and through an intake stroke on a discharge stroke of the first pump. A line interconnects the outlet of the second pump to the material delivery line downstream from and adjacent the outlet of the first pump whereby on each discharge stroke of the first pump the second pump takes in gas and on each intake stroke of the first pump the second pump pumps gas to the material delivery line behind the material delivered into the line through the outlet of the first pump on the preceding stroke of the first pump.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
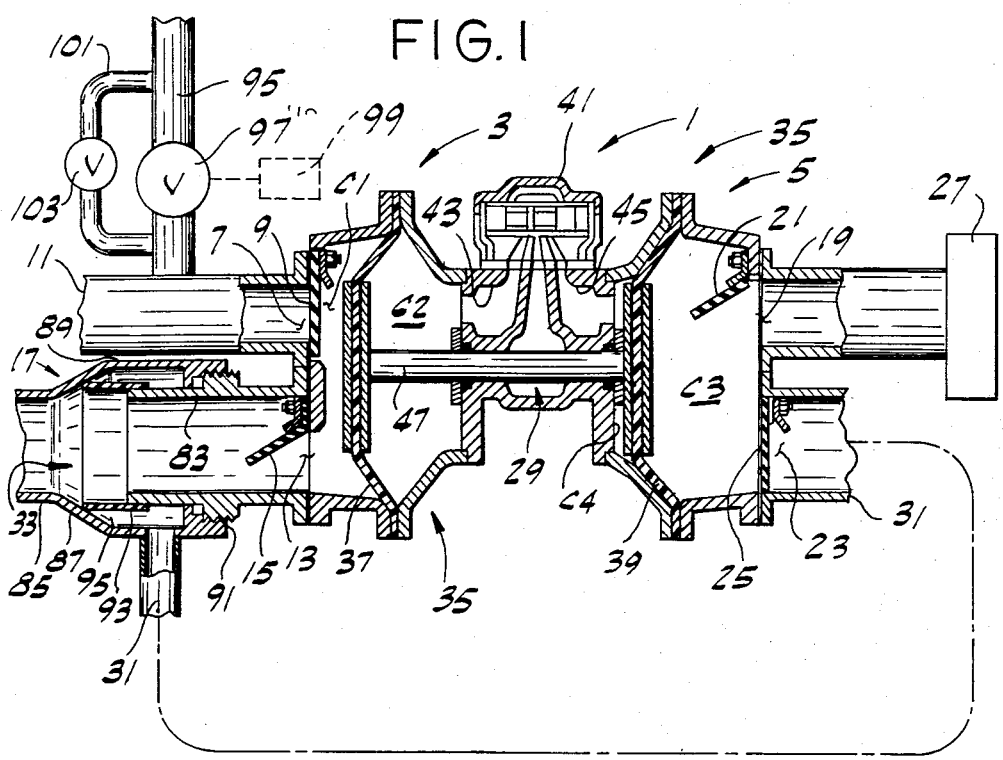
FIG. 1 is a view of apparatus of the present invention with parts broken away and shown in sections.

Referring to FIG. 1 of the drawings, apparatus of this invention, which is particularly adapted for pumping fluent solid material such as powder, is shown to comprise a dual expansible chamber pump generally designated 1, comprising a first expansible chamber pump 3 and a second expansible chamber pump 5. The first pump has an inlet 7 with a check valve 9 for intake through a supply line 11 of fluent material (e.g. powder) to be pumped from a supply thereof (not shown) on an intake stroke of the first pump, and an outlet 13 with a check valve 15 for discharge of the material on a discharge stroke of the first pump through a delivery line 17. The second pump has an inlet 19 with a check valve 21 for intake of gas on an intake stroke of the second pump, and an outlet 23 with a check valve 25 for discharge of gas on a discharge stroke of the second pump. Gas intake may be air intake from the ambient atmosphere via an air filter 27. Means indicated at 29 interconnects the pumps for operation of a second pump 5 through a discharge stroke on an intake stroke of the first pump 3 and through an intake stroke on a discharge stroke of the first pump. A line 31 interconnects the outlet 23 of the second pump 5 to said material delivery line 17 downstream from and adjacent the outlet 13 of the first pump 3, whereby on each discharge stroke of the first pump 3 the second pump 5 takes in gas (e.g. air) and on each intake stroke of the first pump 3 the second pump 5 pumps gas to said material delivery line 17 behind the material delivered into said line through the outlet of said first pump on the preceding stroke of said first pump. A check valve 33 is provided for the line 31 arranged to close on discharge of material through the outlet 13 into said material delivery line 17 and to open on delivery of gas through the line 31.

More particularly, the dual pump 1 is a double-diaphragm pump, each of pumps 3 and 5 being a diaphragm pump comprising a housing generally designated 35 and a diaphragm dividing the housing into a pump chamber and an operating chamber. The diaphragm of the first pump 3 (the material pump) is designated 37 and its pump and operating chambers are respectively designated C1 and C2. The diaphragm of the second pump 5 (the gas pump) is designated 39 and its pump and operating chambers are respectively designated C3 and C4. The pumps are powered by compressed air (or other gas) air operated in conventional manner, an air distributor valve 41 being operable in well-known manner with respect to double-diaphragm pumps alternately to deliver air under pressure to operating chamber C2 of pump 3 while exhausting air from operating chamber C4 of pump 5 as to operate pump 3 through a pumping stroke and pump 5 through an intake stroke, and to deliver air under pressure to chamber C4 of pump 5 while exhausting air from chamber C2 of pump 3 to operate pump 3 through an intake stroke and pump 5 through a pumping stroke. Passage 43 interconnects valve 41 and chamber C2 of pump 3 for delivery to and exhaust of air from this chamber, and passage 45 interconnects valve 41 and chamber C4 of pump 5 for delivery to and exhaust of air from the latter chamber. The aforesaid connecting means 29 comprises a rod 47 interconnecting the diaphragms 37 and 39 so that when one moves to the right as shown in FIG. 1, the other moves to the left, and vice versa.

Figure 2:
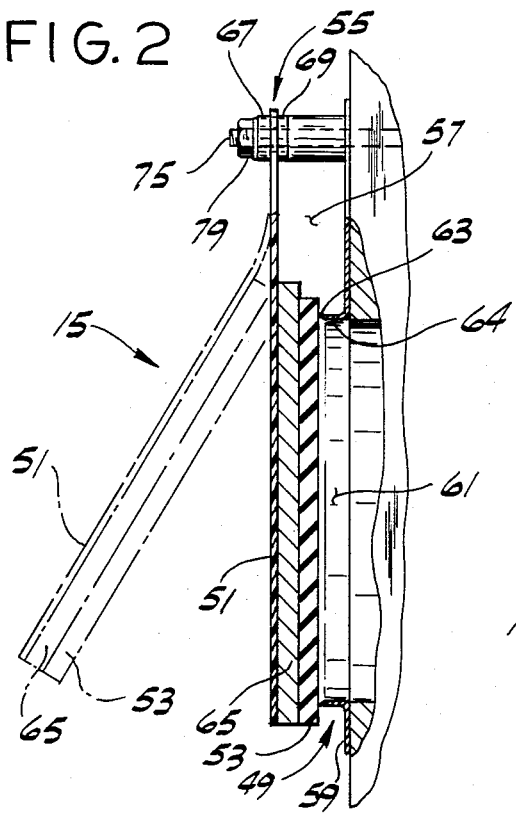
FIG. 2 is a view of a check valve used in a pump of the apparatus showing in solid lines a valve member in closed position and in phantom the valve member open.
Figure 3:
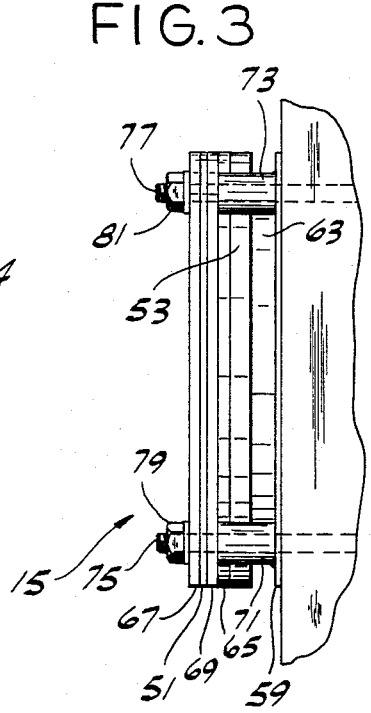
FIG. 3 is an end view of FIG. 2 (as viewed from the top of FIG. 2)

Check valves 9 and 15 for the inlet and outlet, respectively, of pump 3 are generally identical. FIGS. 2 and 3 show the valve (15 being indicated) as comprising an annular raised valve seat 49, a flexible flap 51 carrying a valve member 53 engageable with the seat, and a raised support 55 for the flap with a space 57 below the support. The seat comprises a plate 59 having an opening 61 therein and an annular flange 63 bent up from the material of the plate around the opening. This flange could be a separate attached part. The flange 63 has a relatively thin (e.g., chamfered) edge 64 engageable by the valve member 53. The flap 51 is of pliable material and has a rigid (metal) head 65 or weight secured thereto on the face thereof toward the valve seat. The valve member 53 is an elastomeric member secured on the face of the metal head toward the valve seat and is greater in diameter than the opening 61 to insure full closure of the opening. It is preferably made of a low durometer elastomer resistant to being cut by the flange 63. The raised support 55 comprises upper and lower bars 67 and 69, respectively, extending over bushings 71 and 73 on a pair of bolts 75 and 77 extending from plate 59. Nuts 79 and 81 threaded on the bolts constitute means for clamping the flap 51 between the bars.

At 83 is indicated a relatively short outlet pipe extending from outlet 13 of pump 3. The material delivery line 17 comprises a pipe 85 having a belled end involving a flaring shoulder portion 87 and a ring portion 89 surrounding and sealed to the outlet pipe as by threading at 91. The threading allows for adjustment. A double O-ring and set screw arrangment may be used to permit adjustment. An elastomeric (rubber) sleeve 93 forming a check valve for closing off air line 31 from material discharged into line 17 is fitted on pipe 83 extending off the end of the pipe 83 with its free end normally engaging the interior of shoulder portion 89 to seal off a chamber 95 between 83, 93 and 89. Air line 31 connects to this chamber. The arrangement is such that sleeve 93 normally closes off chamber 95 and line 31 from material delivered through pipe 83 and sleeve 93 but, on delivery of air through line 31 to chamber 95, the sleeve is squeezed to open for flow of the air past the free end of the sleeve into line 17.

FIG. 1 shows diaphragm 37 at the end of its pumping stroke (illustrating valve 9 closed and valve 15 open) and diaphragm 39 at the end of its intake stroke (illustrating valve 21 open and valve 25 closed). At this point, distributor valve 41 directs air under pressure through passage 45 into chamber C4 and opens chamber C2 to exhaust. Accordingly, as diaphragm 37 moves through an intake stroke and diaphragm 39 moves through a pumping stroke valve 9 opens, valve 15 closes, and a charge of fluent material is suctioned into chamber C1 through supply line 11. Valve 21 closes, valve 25 opens, and air under pressure is delivered through line 31 to the space around the sleeve valve 93, squeezing it for disengagement of its free end from shoulder 89, for delivery of a slug of air through line 17 downstream from the valve 93 behind the material delivered into line 17 through pump outlet 13 and pipe 83 on the preceding discharge stroke of diaphragm 37 of the pump 3. Then, distributor valve 41 reverses, directing air under pressure through passage 43 into chamber C2 and opening chamber C4 to exhaust, so that diaphragm 37 is driven through a pumping stroke and diaphragm 39 is driven through an intake stroke. Valve 9 closes, valve 15 opens, and the charge of fluent material that had been suctioned into chamber C1 is pumped out through outlet 13, pipe 83, sleeve 93 and pipe 85. A charge of air is taken into chamber C4 for the next pulsing of air into the line 17 behind a slug of material. The action is repeated, and this effects alternate intake and discharge of fluent material into and out of chamber C1 and air into and out of chamber C3. As will be understood from the above, this motion results in slugs of air being pumped into line 17 between slugs of material.

It will be understood that the two pumps of the apparatus do not have to be of identical size and volume. For example, the first pump 3 could be larger in size and volume than the second pump 5 thereby allowing a larger amount of material to be sucked into chamber C1 and pumped into line 17. In order to accomplish this and still maintain the efficiency of the apparatus, the connecting rod 47 is modified to allow additional extension of it as it moves into the first pump 3. This may be achieved by making the rod of two telescoping sections with a tension spring therebetween. This, when the air from the distributor valve works against the first diaphragm 37, pulling the rod into the first pump, a section of the rod can extend against the bias of the spring and force all the fluent material in chamber C1 through outlet 13. The extended section of the rod will return to its normal position when the valve 41 reverses its action.

In addition, the apparatus may further comprise a line 95 connected to line 11 downstream of the source of fluent material with a valve 97 therein. The latter valve constitutes means for admitting air to chamber C1 of the first pump 3, with the first pump in operation, for flushing the first pump and the material delivery line 17. The system is "flushed" by either opening valve 97 for a certain number of strokes or for a set period of time. A control 99 (shown in phantom) may be used to automatically open and close the valve at predetermined intervals. A by-pass line 101 with a valve 103 therein may be utilized continuously to bleed air into line 11 to dilute the powder stream for better flow and pumping characteristics.

Figure 4:
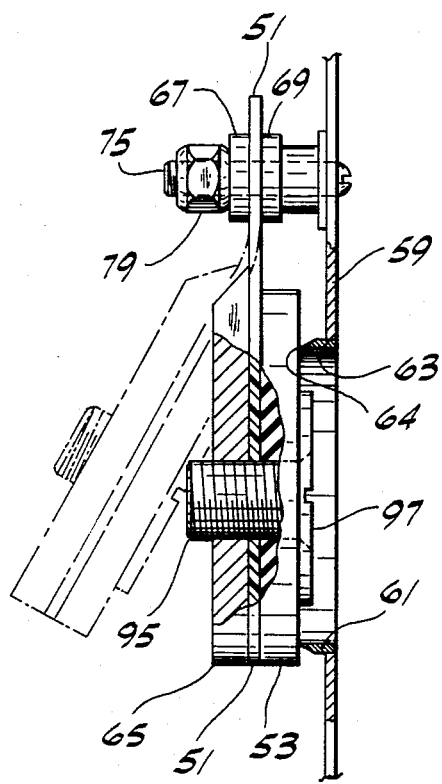
FIG. 4 is a view similar to FIG. 2 showing a modification of the check valve.

The apparatus as above described is such as to enable pumping (or conveying) of the powder with less gas (air) and at lower gas delivery velocity through the delivery line 17 thereby to permit discharge of the powder from line 17 into an open receiver (not shown) without requiring use of means for separating the powder from the gas stream. The valve shown at 33 eliminates obstructions for the flow of powder and also avoids pocketing of the powder. Leakage is avoided by reason of the edge 64 being thin and by reason of the fact that any particle which may remain on the edge generally becomes embedded in the elastomeric valve member. However, a flapper type valve could be used. Moreover, any other suitable type of valve, such as a ball check valve, may be utilized in place of the valves shown. FIG. 4 illustrates a modification of the check valve used at 9 and 15 which is similar to that shown in FIGS. 2 and 3 in comprising plate 59 having opening 61 therein and annular flange 63 as a separate attached part having relatively thin edge 64 engageable by elastomeric valve member 53. The latter is secured on the face of flap 51 toward the valve seat with the metal head or weight 65 on the other face of the flap, the securement being by means of a screw 95 having its head 97 engaging the valve member and threaded in a hole in the head 65.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. Apparatus for pumping fluent solid material comprising:
    a first expansible chamber pump having an inlet with a check valve for intake of material from a supply thereof on an intake stroke of said first pump and an outlet with a check valve for discharge of the material on a discharge stroke of said first pump;
    a line for delivery of material from the outlet of said first pump;
    a second expansible chamber pump having an inlet with a check valve for intake of gas on an intake stroke of said second pump and an outlet with a check valve for discharge of gas on a discharge stroke of said second pump;
    means interconnecting the pumps for operation of the second pump through a discharge stroke on an intake stroke of the first pump and through an intake stroke on a discharge stroke of the first pump; and
    a gas line interconnecting the outlet of the second pump to said material delivery line downstream from and adjacent the outlet of the first pump whereby on each discharge stroke of the first pump the second pump takes in gas and on each intake stroke of the first pump the second pump pumps gas to said material delivery line behind the material delivered into said line through the outlet of said first pump on the preceding stroke of said first pump.

2. Apparatus as set forth in claim 1 wherein a check valve is provided for the gas line arranged to close on discharge of material through the outlet into said material delivery line and to open on delivery of gas through the gas line.

3. Apparatus as set forth in claim 2 having means for admitting gas to said first pump with said first pump in operation for flushing said first pump and said material delivery line.

4. Apparatus as set forth in claim 3 having a material supply line for delivery of material from the supply to the inlet of the first pump and a valved gas intake for said supply line.

5. Apparatus as set forth in claim 2 wherein each check valve in the first pump comprises means providing an annular raised valve seat, a flexible flap carrying a valve member engageable with the seat, and a raised support for the flap with a space below the support.

6. Apparatus as set forth in claim 5 wherein the means providing the seat comprises a plate having an opening therein and an annular flange extending up around the opening, said flange having a relatively thin edge engageable by the valve member, the flap being of pliable material, having a rigid head secured thereto, the valve member being an elastomeric.

7. Apparatus as set forth in claim 2 wherein the check valve for the gas line comprises an elastomeric sleeve through which material is delivered from said first pump, a gas chamber surrounding the sleeve to which gas is delivered by the gas line, the sleeve having a free end engaging a shoulder in the material delivery line.

8. Apparatus as set forth in claim 1 wherein each pump is a diaphragm pump and the means interconnecting the pumps comprises a rod interconnecting the diaphragms of the pumps.

9. Apparatus as set forth in claim 8 wherein a check valve is provided for the gas line arranged to close on discharge of material through the outlet into said material delivery line and to open on delivery of gas through the gas line.

10. Apparatus as set forth in claim 9 having means for admitting gas to said first pump with said first pump in operation for flushing said first pump and for diluting material entering said first pump.

11. Apparatus as set forth in claim 10 having a material supply line for delivery of material from the supply to the inlet of the first pump and a valved gas intake for said supply line.

12. Apparatus as set forth in claim 9 wherein each check valve in the first pump comprises means providing an annular raised valve seat, a flexible flap carrying a valve member engageable with the seat, and a raised support for the flap with a space below the support.

13. Apparatus as set forth in claim 12 wherein the means providing the seat comprises a plate having an opening therein and an annular flange extending up from the plate around the opening, said flange having a relatively thin edge engageable by the valve member, the flap being of relatively thin, pliable material, having a rigid head secured thereto, the valve member being an elastomeric member.

14. Apparatus as set forth in claim 9 wherein the check valve for the gas line comprises an elastomeric sleeve through which material is delivered from said first pump, a gas chamber surrounding the sleeve to which gas is delivered by the gas line, the sleeve having a free end engaging a shoulder in the material delivery line.

* * * * *